(12) United States Patent
Tsubaki

(10) Patent No.: US 10,642,561 B2
(45) Date of Patent: May 5, 2020

(54) DISPLAY CONTROL APPARATUS, DISPLAY CONTROL METHOD, AND COMPUTER READABLE MEDIUM

(71) Applicant: MITSUBISHI ELECTRIC CORPORATION, Tokyo (JP)

(72) Inventor: Yasunori Tsubaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/323,483

(22) PCT Filed: Sep. 14, 2016

(86) PCT No.: PCT/JP2016/077130
§ 371 (c)(1),
(2) Date: Feb. 5, 2019

(87) PCT Pub. No.: WO2018/051434
PCT Pub. Date: Mar. 22, 2018

(65) Prior Publication Data
US 2019/0205080 A1 Jul. 4, 2019

(51) Int. Cl.
*G09G 3/00* (2006.01)
*G06F 3/14* (2006.01)
(Continued)

(52) U.S. Cl.
CPC ............. *G06F 3/1423* (2013.01); *G09G 5/00* (2013.01); *H04N 21/431* (2013.01); *H04N 21/436* (2013.01)

(58) Field of Classification Search
CPC .......... G09G 5/00; G09G 3/00; G09G 3/2018; G09G 3/36; G09G 3/3644; G06F 3/1423;
(Continued)

(56) References Cited

U.S. PATENT DOCUMENTS 5,784,035 A   7/1998  Hagiwara et al.
2013/0328745 A1*  12/2013  Koltuk ................. G06F 3/1446
                                                              345/1.3
2016/0227179 A1*  8/2016  Yanazume ........... H04N 9/3185

FOREIGN PATENT DOCUMENTS

JP   H09-204164 A    8/1997
JP   2001-148806 A   5/2001
(Continued)

OTHER PUBLICATIONS

International Search Report for PCT/JP2016/077130 (PCT/ISA/210) dated Nov. 8, 2016.
(Continued)

*Primary Examiner* — Lisa S Landis
(74) *Attorney, Agent, or Firm* — Birch, Stewart, Kolasch & Birch, LLP

(57) ABSTRACT

A display image generation unit generates a first display image to be output to a display apparatus and a second display image to be output to a slave display control terminal. A first output unit outputs the first display image to the display apparatus. A second output unit outputs the second display image to the slave display control terminal. A frame progress computation unit controls a timing of the output of the first display image by the first output unit based on a synthesized image delay time being a delay time from the output of the second display image to the slave display control terminal by the second output unit to output of a synthesized image from the slave display control terminal to the display apparatus, the synthesized image being obtained by synthesizing a third display image with the second display image in the slave display control terminal.

8 Claims, 16 Drawing Sheets

(51) Int. Cl.
*H04N 21/436* (2011.01)
*H04N 21/431* (2011.01)
*G09G 5/00* (2006.01)

(58) Field of Classification Search
CPC .... G06F 3/1431; G06F 3/1438; G06F 3/1446; G06F 3/14; H04N 21/431; H04N 21/436
See application file for complete search history.

(56) References Cited

FOREIGN PATENT DOCUMENTS

| | | | |
|---|---|---|---|
| JP | 2012-212061 | A | 11/2012 |
| JP | 2013-055597 | A | 3/2013 |
| JP | 2016-090894 | A | 5/2016 |

OTHER PUBLICATIONS

Office Action dated Jul. 17, 2018 for Japanese Patent Application No. 2018-523822.

\* cited by examiner

DISPLAY CONTROL APPARATUS, DISPLAY CONTROL METHOD, AND COMPUTER READABLE MEDIUM

TECHNICAL FIELD

The present invention relates to a display control apparatus, a display control method, and a display control program.

BACKGROUND ART

In multi-screen display systems, a display image is output to each of display apparatuses to which a plurality of display control terminals are respectively connected.

In a conventional multi-screen display system, a display control command transmission apparatus instructs the plurality of display control terminals that operate completely independently to perform contents reproduction. Each display control terminal cooperates with a time synchronization server apparatus and an offset time generation apparatus and performs display timing synchronization among the display control terminals, thereby synchronizing display images on all display apparatuses.

CITATION LIST

Patent Literature

Patent Literature 1: JP 2013-55597 A

SUMMARY OF INVENTION

Technical Problem

In the technology in Patent Literature 1, however, there is a problem that the display control command transmission apparatus, the time synchronization server apparatus, and the offset time generation apparatus are necessary, in addition to the display control terminals and the display apparatuses, so that the configuration and control are complex.

An object of the present invention is to solve the problem as mentioned above. That is, a main object of the present invention is to match output timings of display images to a plurality of display apparatuses by a simple configuration and simple control.

Solution to Problem

A display control apparatus according to the present invention, which is connected to a first display apparatus and a cooperation apparatus connected to a second display apparatus, includes:

a display image generation unit to generate a first display image to be output to the first display apparatus and a second display image to be output to the cooperation apparatus;

a first output unit to output the first display image to the first display apparatus;

a second output unit to output the second display image to the cooperation apparatus; and an output timing control unit to control a timing of output of the first display image by the first output unit, based on a synthesized image delay time being a delay time from the output of the second display image to the cooperation apparatus by the second output unit to output of a synthesized image from the cooperation apparatus to the second display apparatus, the synthesized image being obtained by synthesizing a third display image with the second display image in the cooperation apparatus.

Advantageous Effects of Invention

According to the present invention, the output timing of the first image to the first display apparatus and an output timing of the synthesized image to the second display apparatus can be matched by a simple configuration and simple control.

DESCRIPTION OF EMBODIMENTS

Hereinbelow, embodiments of the present invention will be described with use of the drawings. In following description and the drawings on the embodiments, elements pro- Embodiment 1

Description of Configuration

Figure 1:
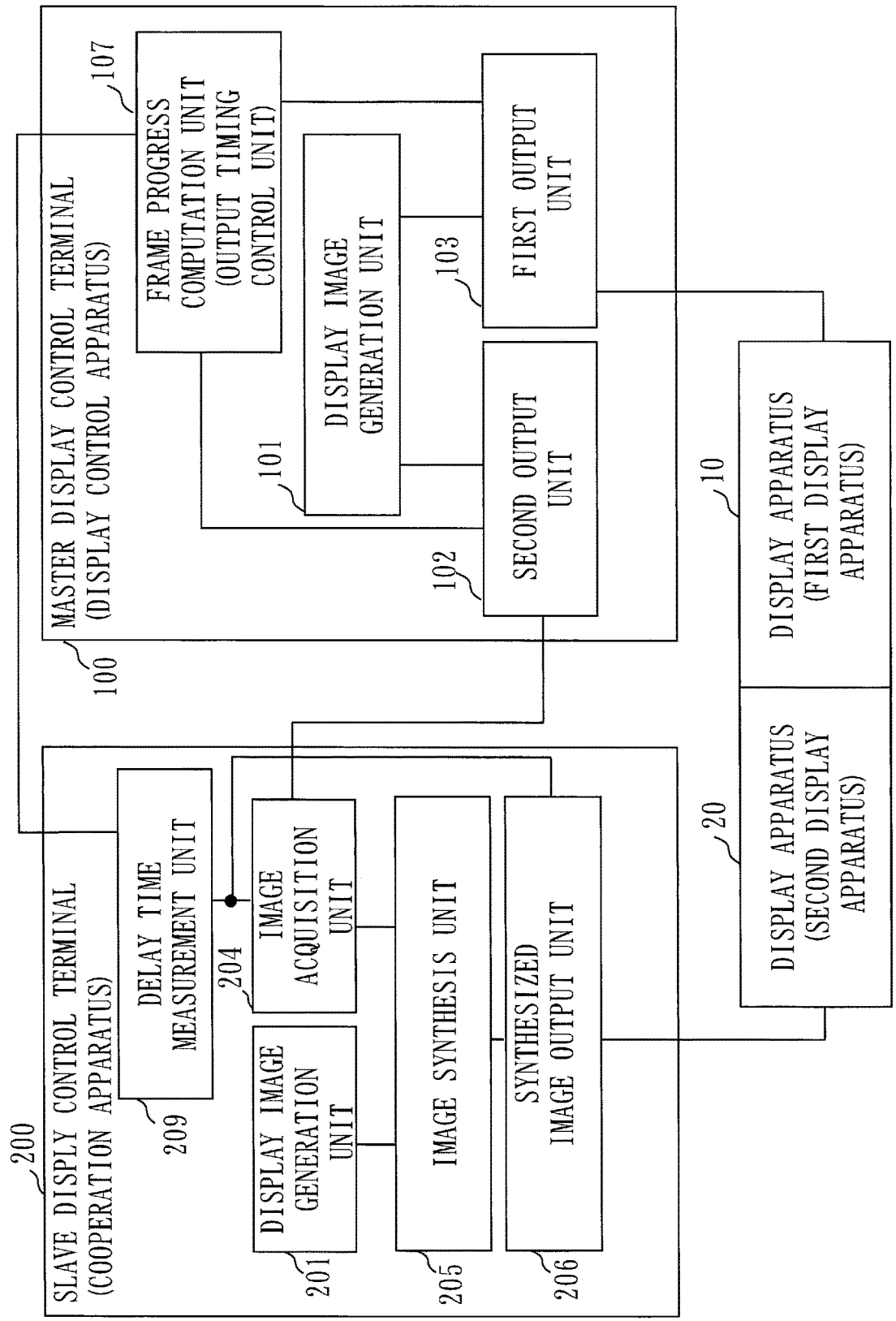
FIG. 1 is a diagram illustrating a configuration example of a multi-screen synthesizing display system according to Embodiment 1.

FIG. 1 illustrates a configuration example of a multi-screen synthesizing display system according to this embodiment.

The multi-screen synthesizing display system according to this embodiment is configured with a master display control terminal 100, a slave display control terminal 200, a display apparatus 10 and a display apparatus 20.

The master display control terminal 100 is connected to the display apparatus 10. The slave display control terminal 200 is connected to the display apparatus 20. Further, the master display control terminal 100 is connected to the slave display control terminal 200.

The display apparatus 10 and the display apparatus 20 have a same display size in this embodiment. However, the display apparatus 10 and the display apparatus 20 may have different display sizes.

The master display control terminal 100 corresponds to a display control apparatus. The slave display control terminal 200 corresponds to a cooperation apparatus. The display apparatus 10 corresponds to a first display apparatus. The display apparatus 20 corresponds to a second display apparatus. Operations that are performed by the master display control terminal 100 correspond to a display control method.

Figure 15:
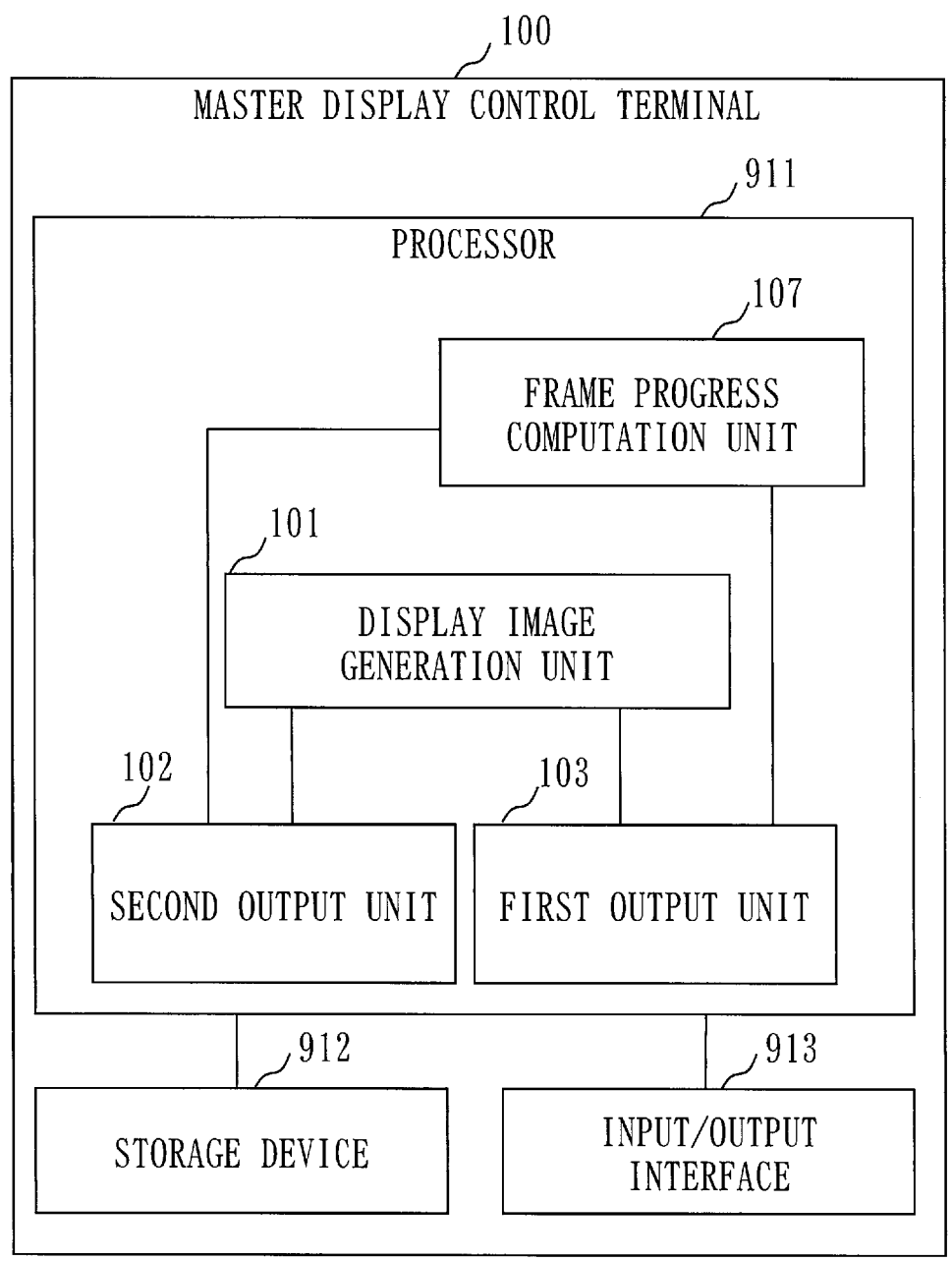
FIG. 15 is a diagram illustrating a hardware configuration example of the master display control terminal according to Embodiment 1.

The master display control terminal 100 is a computer that is implemented by a hardware configuration illustrated in FIG. 15, for example. The slave display control terminal 200 is a computer that is implemented by a hardware configuration illustrated in FIG. 16, for example.

The master display control terminal 100 includes a processor 911, a storage device 912, and an input/output interface 913, as hardware.

Programs for implementing functions of a display image generation unit 101, a second output unit 102, a first output unit 103, and a frame progress computation unit 107 illustrated in FIG. 1 are stored in the storage device 912.

Then, the processor 911 executes these programs, thereby performing the operations of the display image generation unit 101, the second output unit 102, the first output unit 103, and the frame progress computation unit 107 that will be described later.

FIG. 15 schematically illustrates a state where the processor 911 executes the programs to implement the functions of the display image generation unit 101, the second output unit 102, the first output unit 103, and the frame progress computation unit 107. The programs to implement the functions of the display image generation unit 101, the second output unit 102, the first output unit 103, and the frame progress computation unit 107 correspond to a display control program.

The input/output interface 913 is an interface circuit between the slave display control terminal 200 and the display apparatus 10.

The slave display control terminal 200 includes a processor 921, a storage device 922, and an input/output interface 923, as hardware.

Programs for implementing functions of a display image generation unit 201, an image acquisition unit 204, an image synthesis unit 205, a synthesized image output unit 206, and a delay time measurement unit 209 illustrated in FIG. 1 are stored in the storage device 992.

Then, the processor 921 executes these programs, thereby performing operations of the display image generation unit 201, the image acquisition unit 204, the image synthesis unit 205, the synthesized image output unit 206, and the delay time measurement unit 209 that will be described later.

Figure 16:
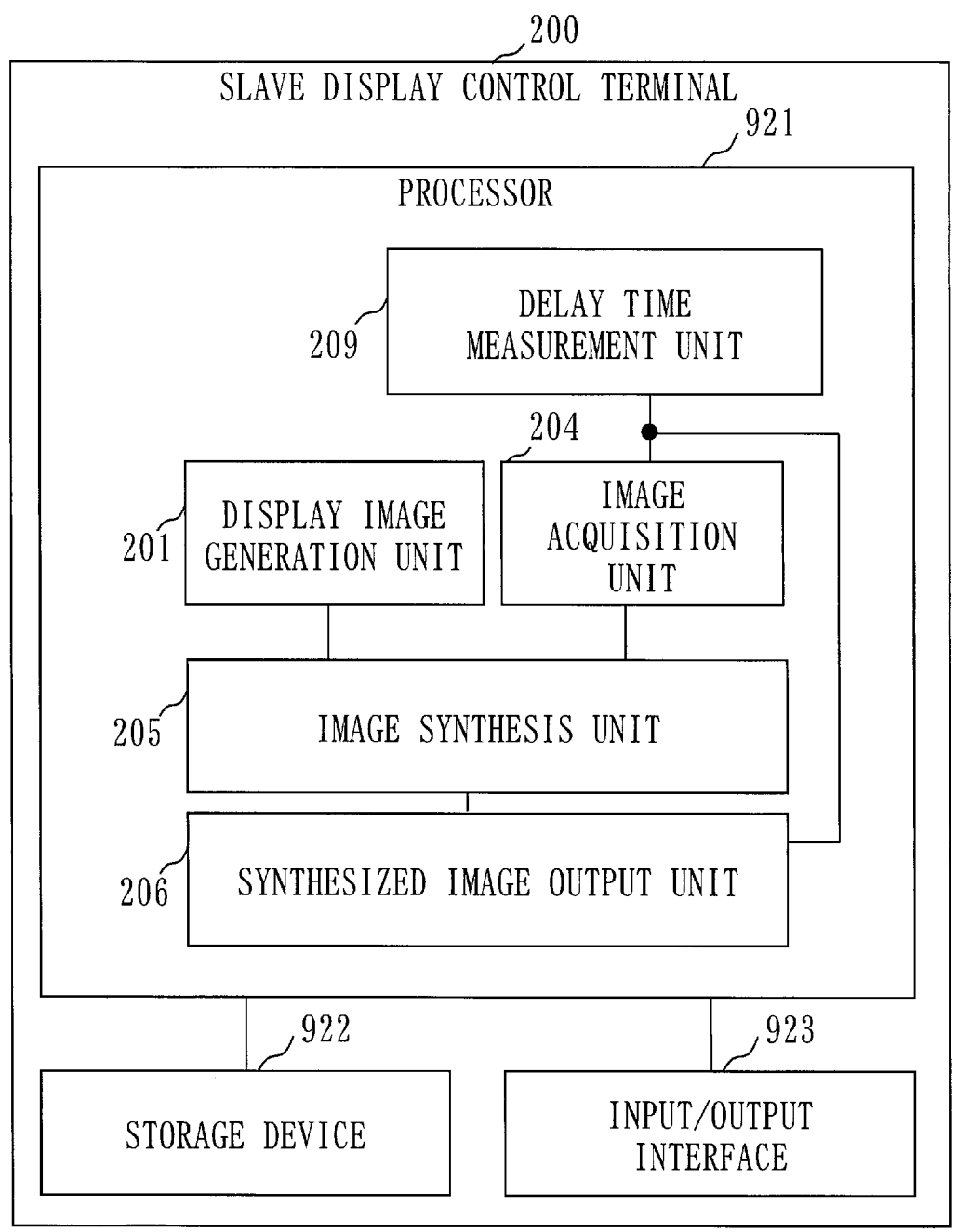
FIG. 16 is a diagram illustrating a hardware configuration example of the slave display control terminal according to Embodiment 1.

FIG. 16 schematically illustrates a state where the processor 921 executes the programs to implement the functions of the display image generation unit 201, the image acquisition unit 204, the image synthesis unit 205, the synthesized image output unit 206, and the delay time measurement unit 209.

The input/output interface 923 is an interface circuit between the master display control terminal 100 and the display apparatus 20.

Subsequently, an outline of the operations of the master display control terminal 100 and the slave display control terminal 200 will be described before the components of the master display control terminal 100 and the slave display control terminal 200 illustrated in FIG. 1 are described.

Figure 2:
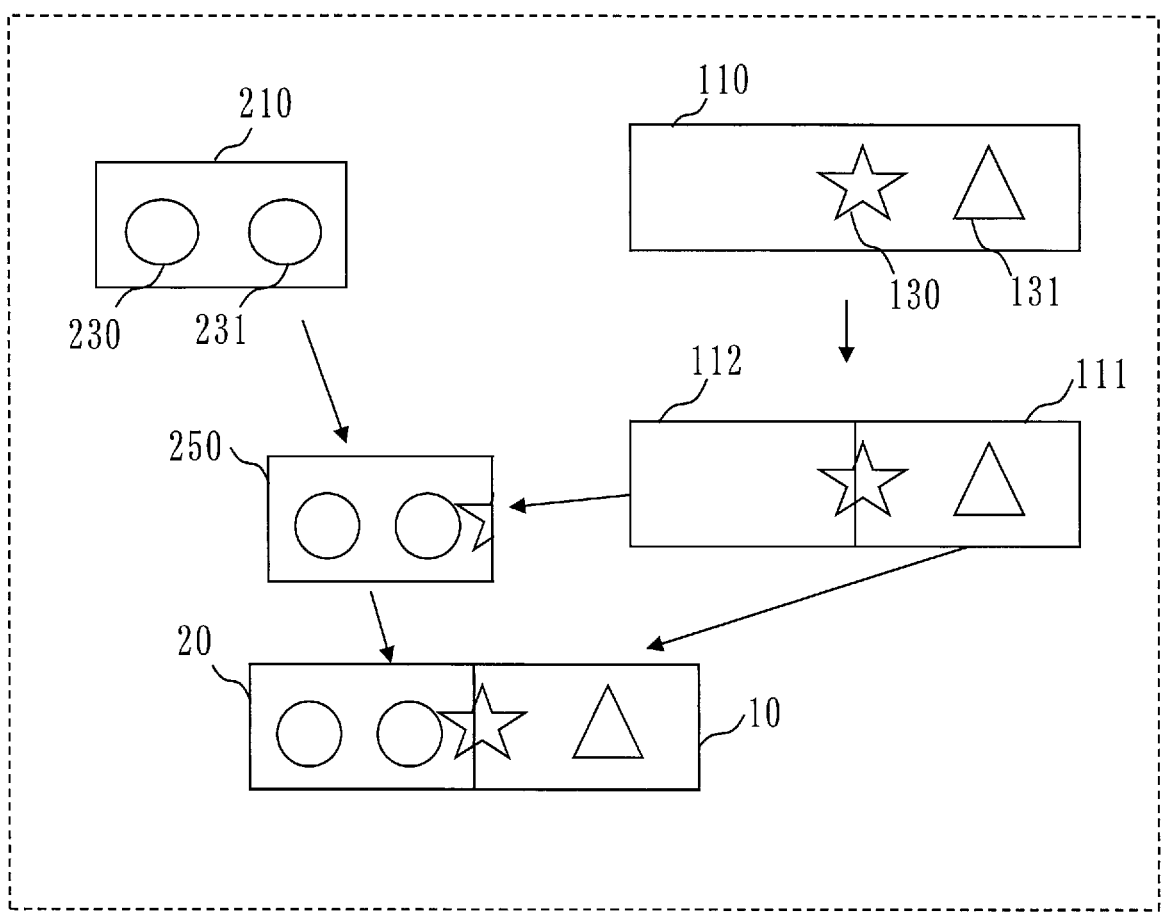
FIG. 2 is a diagram illustrating examples of display images according to Embodiment 1.

FIG. 2 illustrates examples of display images.

A master original display image 110 is generated in the master display control terminal 100. The master original display image 110 is a display image of a size corresponding to the total display size of the display apparatus 10 and the display apparatus 20. The master original display image 110 includes contents 130 and contents 131. Each contents is an application, a video, a still picture, a character string, or the like.

A slave original display image 210 is generated in the slave display control terminal 200. The slave original display image 210 is a display image of a size corresponding to the display size of the display apparatus 20. The slave original display image 210 includes contents 230 and contents 231.

The master display control terminal 100 divides the master original display image 110 into a master display image 111 and a slave display image 112. The master display image 111 is output to the display apparatus 10 from the master display control terminal 100. The slave display image 112 is output to the slave display control terminal 200 from the master display control terminal 100.

The slave display control terminal 200 synthesizes the slave display image 112 and the slave original display image 210, thereby generating a synthesized image 250. Then, the slave display control terminal 200 outputs the synthesized image 250 to the display apparatus 20.

With the above arrangement, the master display image 111 is displayed on the display apparatus 10, and the synthesized image 250 is displayed on the display apparatus 20.

The master display image 111 is directly output from the master display control terminal 100 to the display apparatus 10. On the other hand, the slave display image 112 is output from the master display control terminal 100 to the slave display control terminal 200, is further synthesized with the slave original display image 210 in the slave display control terminal 200, and is output from the slave display control terminal 200 to the display apparatus 20, as the synthesized image 250.

In order to display the master display image 111 and the synthesized image 250 without visual discomfort, it is necessary to adjust an output timing of the master display image 111 from the master display control terminal 100 to the display apparatus 10. Specifically, the master display control terminal 100 needs to adjust the output timing of the master display image 111, in association with a delay time (hereinafter referred to as a synthesized image delay time)

from the output of the slave display image 112 to the slave display control terminal 200 to the output of the synthesized image 250 from the slave display control terminal 200 to the display apparatus 20.

In this embodiment, the master display control terminal 100 adjusts the output timing of the master display image 111, based on the synthesized image delay time, thereby causing the master display image 111 and the synthesized image 250 to be displayed without the visual discomfort.

The master display image 111 corresponds to a first display image, the slave display image 112 corresponds to a second display image, and the slave original display image 210 corresponds to a third display image.

Subsequently, details of the components of the master display control terminal 100 and the slave display control terminal 200 will be described.

Referring to FIG. 1, the display image generation unit 101 repeatedly generates the master original display image 110 at certain image generation intervals.

That is, the display image generation unit 101 repeatedly generates the master display image 111 to be output to the display apparatus 10 and the slave display image 112 to be output to the slave display control terminal 200 at the certain image generation intervals.

The process that is performed by the display image generation unit 101 corresponds to a display image generation process.

The first output unit 103 repeatedly outputs the master display image 111 to the display apparatus 10 at certain output intervals.

The first output unit 103 buffers each master display image 111 generated by the display image generation unit 101. The first output unit 103 selects, from among each master display image 111 that has been buffered, an output target master display image and outputs the selected master display image 111 to the display apparatus 10, based on a notification from the frame progress computation unit 107 that will be described later.

The process that is performed by the first output unit 103 corresponds to a first output process.

The second output unit 102 repeatedly outputs the slave display image 112 to the slave display control terminal 200 at the certain output intervals.

The process that is performed by the second output unit 102 corresponds to a second output process.

The frame progress computation unit 107 controls the timing of the output of the master display image 111 by the first output unit 103, based on the synthesized image delay time. As described above, the synthesized image delay time is the delay time from the output of the slave display image 112 to the slave display control terminal 200 by the second output unit 102 to the output of the synthesized image 250 obtained by the synthesis of the slave original display image 210 with the slave display image 112 in the slave display control terminal 200 from the slave display control terminal 200 to the display apparatus 20.

The frame progress computation unit 107 controls the timing of the output of the master display image 111 by the first output unit 103 so that the output of the synthesized image 250 to the display apparatus 20 by the slave display control terminal 200 and the output of the master display image 111 to the display apparatus 10 by the first output unit 103 are concurrently performed.

When there is no deviation between a cycle of the output of the master display image 111 by the first output unit 103 and a cycle of the output of the slave display image 112 by the second output unit 102, the frame progress computation unit 107 controls the timing of the output of the master display image 111 as follows. That is, the frame progress computation unit 107 adjusts the timing of the output of the master display image 111 by the first output unit 103, based on a division value that is obtained by dividing the synthesis delay time by the image generation interval of the display image generation unit 101. Specifically, the frame progress computation unit 107 notifies the division value (with a portion after the decimal point thereof carried up) (hereinafter referred to as the number of frames that have progressed) to the first output unit 103. The first output unit 103 specifies, among each master display image 111 that has been buffered, one or more master display images 111 corresponding to the division value, as an output target, and outputs the specified one or more master display images 111 of the output target.

When there is a deviation between the cycle of the output of the master display image 111 by the first output unit 103 and the cycle of the output of the slave display image 112 by the second output unit 102, the frame progress computation unit 107 adjusts the timing of the output of the master display image 111 as follows. That is, the frame progress computation unit 107 adjusts the timing of the output of the master display image 111 by the first output unit 103, based on a division value (with a portion after the decimal point thereof carried up) (hereinafter referred to as the number of frames that have progressed) that is obtained by dividing a total time of the deviation and the synthesized image delay time by the image generation interval of the display image generation unit 101. Specifically, the frame progress computation unit 107 notifies the division value to the first output unit 103. The first output unit 103 specifies, among each master display image 111 that has been buffered, one or more master display images 111 corresponding to the division value, as an output target, and outputs the specified one or more master display images 111 of the output target.

The synthesized image delay time is notified from the delay time measurement unit 209 that will be described later.

The frame progress computation unit 107 corresponds to an output timing control unit. The process that is performed by the frame progress computation unit 107 corresponds to an output timing control process.

The display image generation unit 201 generates the slave original display image 210 at the certain image generation intervals.

The image acquisition unit 204 acquires the slave display image 112 from the second output unit 102, in synchronization with the output cycle of the second output unit 102.

The image synthesis unit 205 acquires the slave original display image 210 from the display image generation unit 201 and buffers the acquired slave original display image 210. The image synthesis unit 205 acquires the slave display image 112 from the image acquisition unit 204 and buffers the acquired slave display image 112. Then, the image synthesis unit 205 synthesizes the slave original display image 210 and the slave display image 112 at certain synthesis intervals, thereby generating the synthesized image 250.

The synthesized image output unit 206 outputs the synthesized image 250 at the certain output intervals.

The delay time measurement unit 209 measures the synthesized image delay time. That is, the delay time measurement unit 209 measures the delay time from the acquisition of the slave display image 112 by the image acquisition unit 204 to the output of the synthesized image 250 to the display apparatus 20 by the synthesized image output unit 206, as the synthesized image display time.

Then, the delay time measurement unit 209 notifies the measured synthesized image delay time to the frame progress computation unit 107.

Description of Operations

Subsequently, the operations of the master display control terminal 100 and the slave display control terminal 200 according to this embodiment will be described. An example of displaying the display images illustrated in FIG. 2 will be described below. In the following description, it is assumed that there is the deviation between the output cycle of the first output unit 103 and the output cycle of the second output unit 102. Further, in the following description, it is assumed that the frame progress computation unit 107 holds the deviation between the output cycle of the first output unit 103 and the output cycle of the second output unit 102, as a predetermined value. If the frame progress computation unit 107 does not hold the deviation between the output cycles as the predetermined value, the frame progress computation unit 107 computes a deviation for each frame, using a time when the first output unit 103 outputs the master display image 111 to the display apparatus 10 and a time when the second output unit 102 outputs the slave display image 112 to the slave display terminal 200, when the frame progress computation unit 107 computes the number of frames that have progressed.

Figure 3:
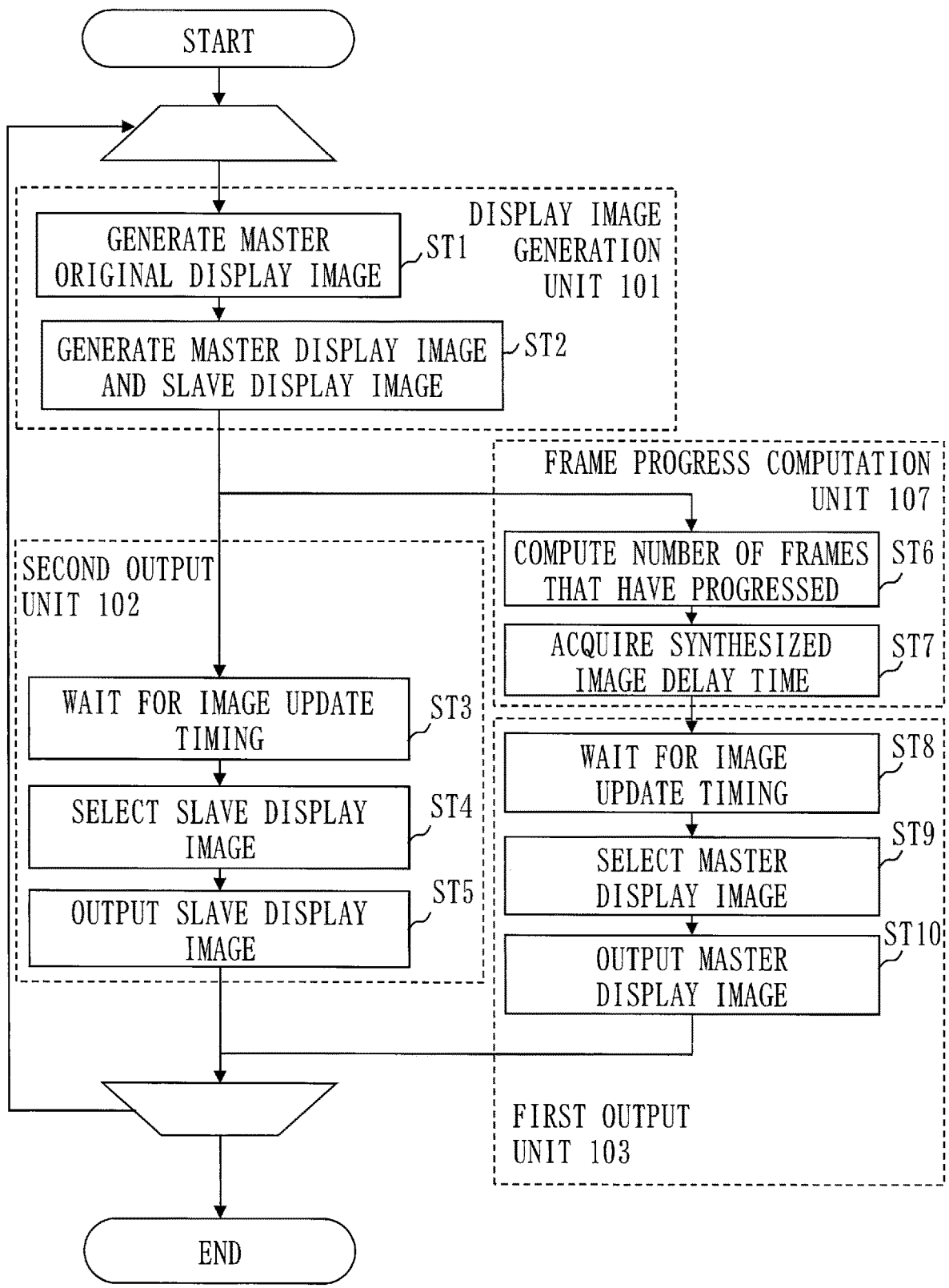
FIG. 3 is a flowchart diagram illustrating an operation example of a master display control terminal according to Embodiment 1.

FIG. 3 illustrates an operation example of the master display control terminal 100.

In step ST1, the display image generation unit 101 generates the master original display image 110 and frame identification information. The frame identification information is identification information of the master original display image 110, and it is assumed in this embodiment that the frame identification information is a sequence number set in the master original display image 110.

In step ST2, the display image generation unit 101 generates the master display image 111 and the slave display image 112 from the master original display image 110. Then, the display image generation unit 101 writes the master display image 111 into the frame buffer of the first output unit 103 and writes the slave display image 112 into the frame buffer of the second output unit 102. The display image generation unit 101 notifies the frame identification information to the first output unit 103 and the second output unit 102.

In step ST3, the second output unit 102 waits for a screen update timing. The second output unit 102 detects the screen update timing, using a vertical synchronization signal, for example.

In step ST4, the second output unit 102 selects an output target slave display image 112.

In step ST5, the second output unit 102 outputs the selected slave display image 112 to the image acquisition unit 204.

In the slave display control terminal 200, the image acquisition unit 204 acquires the slave display image 112 and stores the slave display image 112 in a frame buffer, which will be described later. The image acquisition unit 204 notifies, to the delay time measurement unit 209, a time when the image acquisition unit 204 has acquired the slave display image 112.

In step ST6, the frame progress computation unit 107 computes the number of frames that have been progressed, using an image generation interval and a total time of a synthesized image delay time and the deviation between the output cycles of the first output unit 103 and the second output unit 102. The method of computing the number of the frames that have progressed will be described later. The frame progress computation unit 107 notifies, to the first output unit 103, the number of the frames that have been progressed.

In step ST7, the frame progress computation unit 107 is notified of the synthesized image delay time from the delay time measurement unit 209 and stores the notified synthesized image delay time in the storage device 912.

In step ST8, the first output unit 103 waits for a screen update timing. The first output unit 103 detects the screen update timing, using a virtual synchronization signal, for example.

In step ST9, the first output unit 103 selects an output target master display image 111 from among each master display image 111 stored in the frame buffer, based on the number of the frames that have progressed notified from the frame progress communication unit 108.

In step ST10, the first output unit 103 outputs to the display apparatus 10, the output target master display image 111.

As illustrated in FIG. 2, the display image generation unit 101 may divide the master original display image 110 into the master display image 111 and the slave display image 112. Alternatively, the display image generation unit 101 may directly generate the master display image 111 and the slave display image 112 without generating the master original display image 110.

Referring to FIG. 3, ST3 to ST5 and ST6 to ST10 are set to concurrent processes. However, ST3 to ST5 and ST6 to ST10 may be sequentially executed. The order of each step in FIG. 3 may be changed in a range in which no contradiction occurs.

Figure 4:
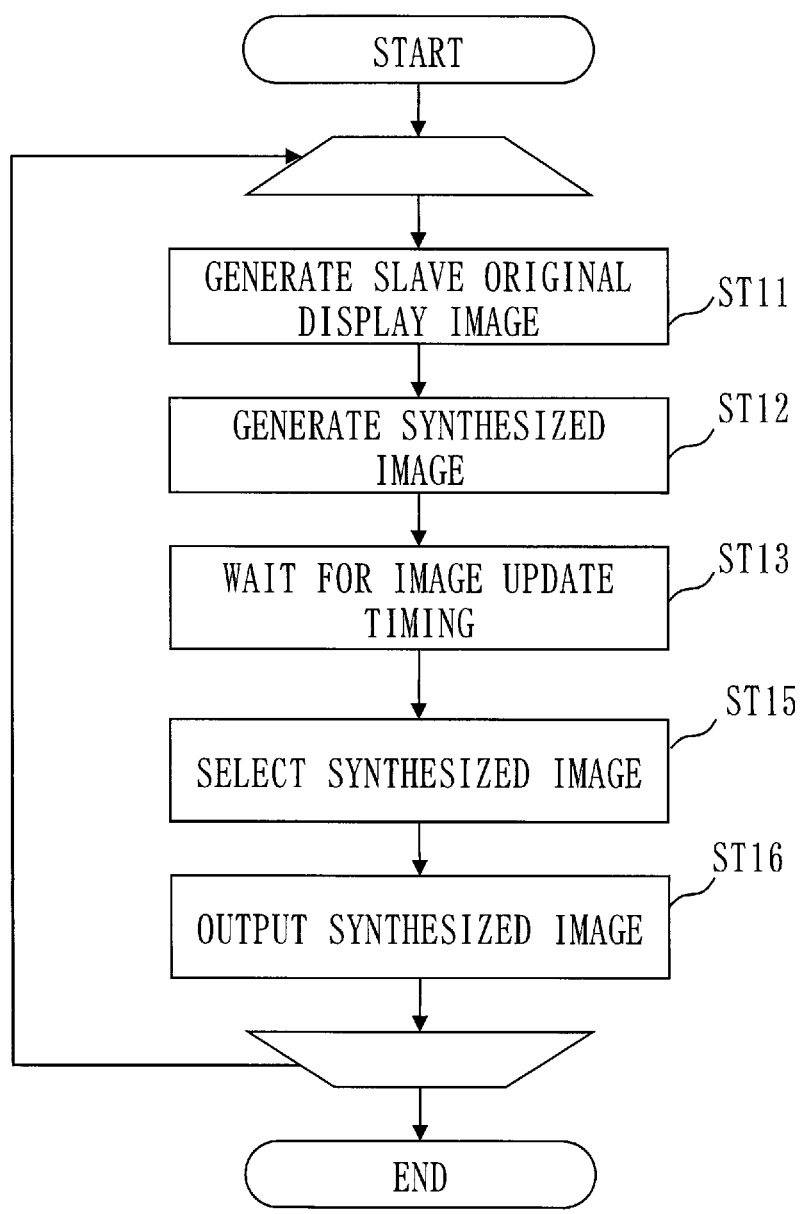
FIG. 4 is a flowchart diagram illustrating an operation example of a slave display control terminal according to Embodiment 1.

FIG. 4 illustrates operation examples of the display image generation unit 201, the image synthesis unit 205, and the synthesized image output unit 206 of the slave display control terminal 200.

In step ST11, the display image generation unit 201 generates the slave original display image 210.

In step ST12, the image synthesis unit 205 generates the synthesized image 250 by synthesizing the slave original display image 210 and the slave display image 112 acquired from the second output unit 102 by the image acquisition unit 204. The image synthesis unit 205 writes the synthesized image 250 into the frame buffer of the synthesized image output unit 206.

In step ST13, the synthesized image output unit 206 waits for an image update timing.

In step ST15, the synthesized image output unit 206 selects an output target synthesized image 250.

In step ST16, the synthesized image output unit 206 outputs the selected synthesized image 250 to the display apparatus 20.

Further, the synthesized image output unit 206 notifies, to the delay time measurement unit 209, a time when the synthesized image output unit 206 has output the synthesized image 250.

Figure 5:
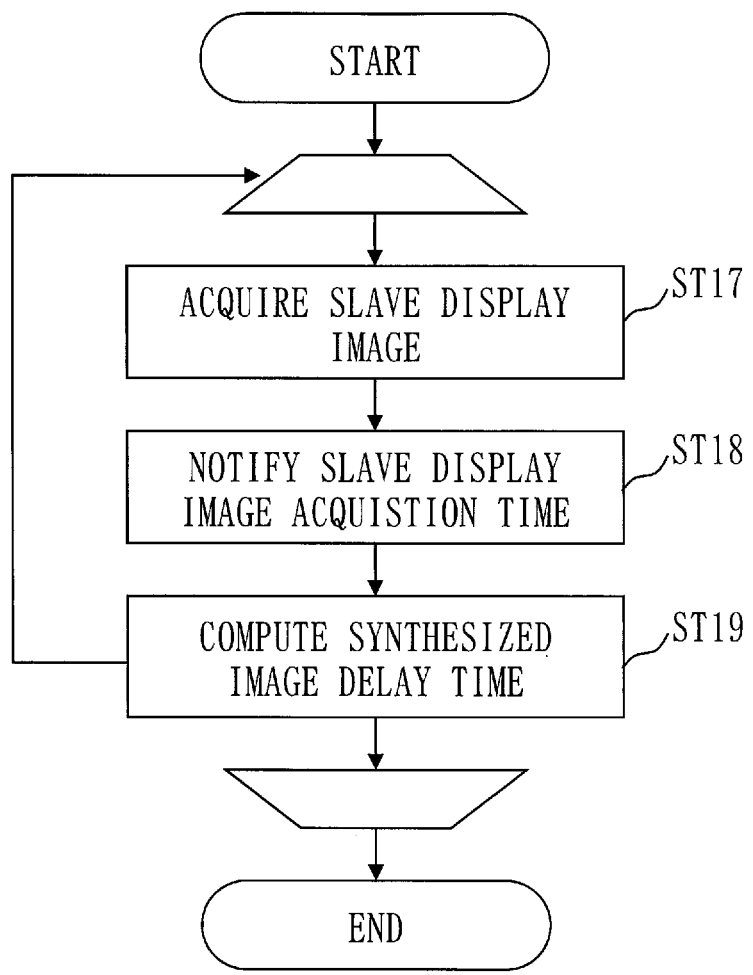
FIG. 5 is a flowchart diagram illustrating an operation example of the slave display control terminal according to Embodiment 1.

FIG. 5 illustrates an operation example of each of the image acquisition unit 204 and the delay time measurement unit 209 of the slave display control terminal 200.

In step ST17, the image acquisition unit 204 acquires the slave display image 112 and stores the slave display image 112 in the frame buffer.

In step ST18, the image acquisition unit 204 notifies, to the delay time measurement unit 209, a time when the image acquisition unit 204 has acquired the slave display image 112.

In step ST19, the delay time measurement unit 209 computes the synthesized image delay time, using the acquisition time of the slave display image 112 notified in step ST18 and the output time of the synthesized image 250 notified in step ST16 in FIG. 4. The delay time measurement unit 209 subtracts the acquisition time of the slave display image 112 from the output time of the synthesized image 250, thereby obtaining the synthesized image delay time.

Then, the delay time measurement unit 209 notifies the synthesized image delay time to the frame progress computation unit 107.

Subsequently, a description will be given about the process of computing a number F of frames that have progressed, by the frame progress computation unit 107, illustrated in step ST6 in FIG. 3.

The frame progress computation unit 107 computes the number F of the frames that have progressed, based on the following expressions:

$$F=\text{ceil}((D1+D2)/V) \quad \text{Expression (1)}$$

$$D2=T2-T1 \quad \text{Expression (2)}$$

$$D1=T3-T2 \quad \text{Expression (3)}$$

F is the number of the frames that have progressed, that is, a value (a buffered amount) obtained by conversion of a change in output times of the master display image 111 and the synthesized image 250 (a progress degree of one to the other) into the number of the frames for a period from a point of time of output of a previous frame to a point of time of output of a current frame. D1 is a synthesized image delay time notified from the delay time measurement unit 209. D2 is a deviation time between the output cycle of the first output unit 103 and the output cycle of the second output unit 102. V is the image generation interval of the display image generation unit 101. ceil (x) indicates a process of rounding up digits after the decimal point of a numerical value. T1 is a time of output of the master display image 111 by the first output unit 103. T2 is a time of output of the slave display image 112 by the second output unit 102. T3 is a time of output of the synthesized image by the synthesized image output unit 206.

When there is no deviation between the output cycle of the first output unit 103 and the output cycle of the second output unit 102, namely, when T1=T2, D2=0. Thus, the frame progress computation unit 107 can compute the number of frames that have progressed, using F=ceil (D1/V).

Subsequently, a description will be given about the process of selecting the output target master display image 111 by the first output unit 103, illustrated in ST9 in FIG. 3.

Figure 6:
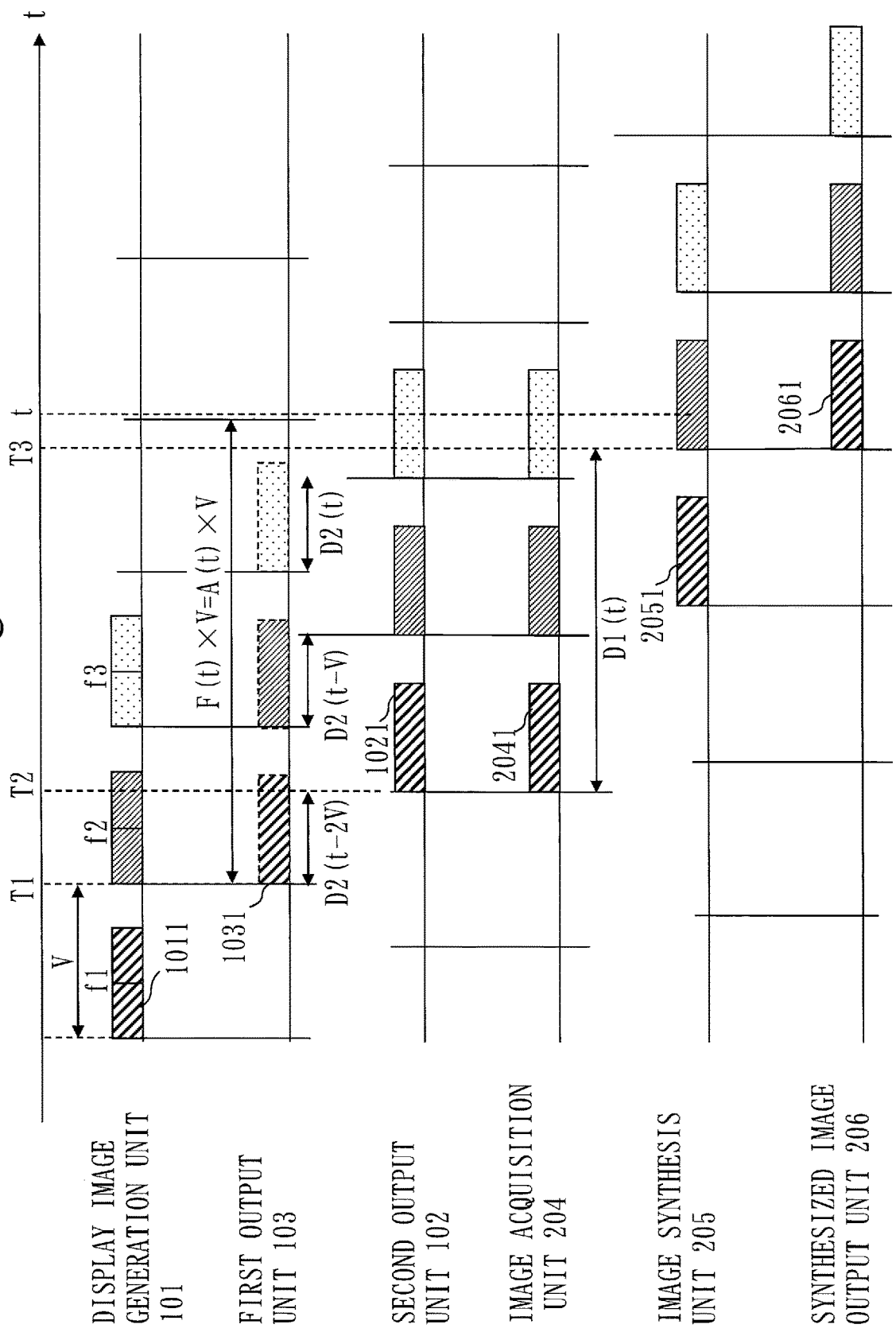
FIG. 6 is a diagram illustrating display image output timings according to Embodiment 1.
Figure 7:
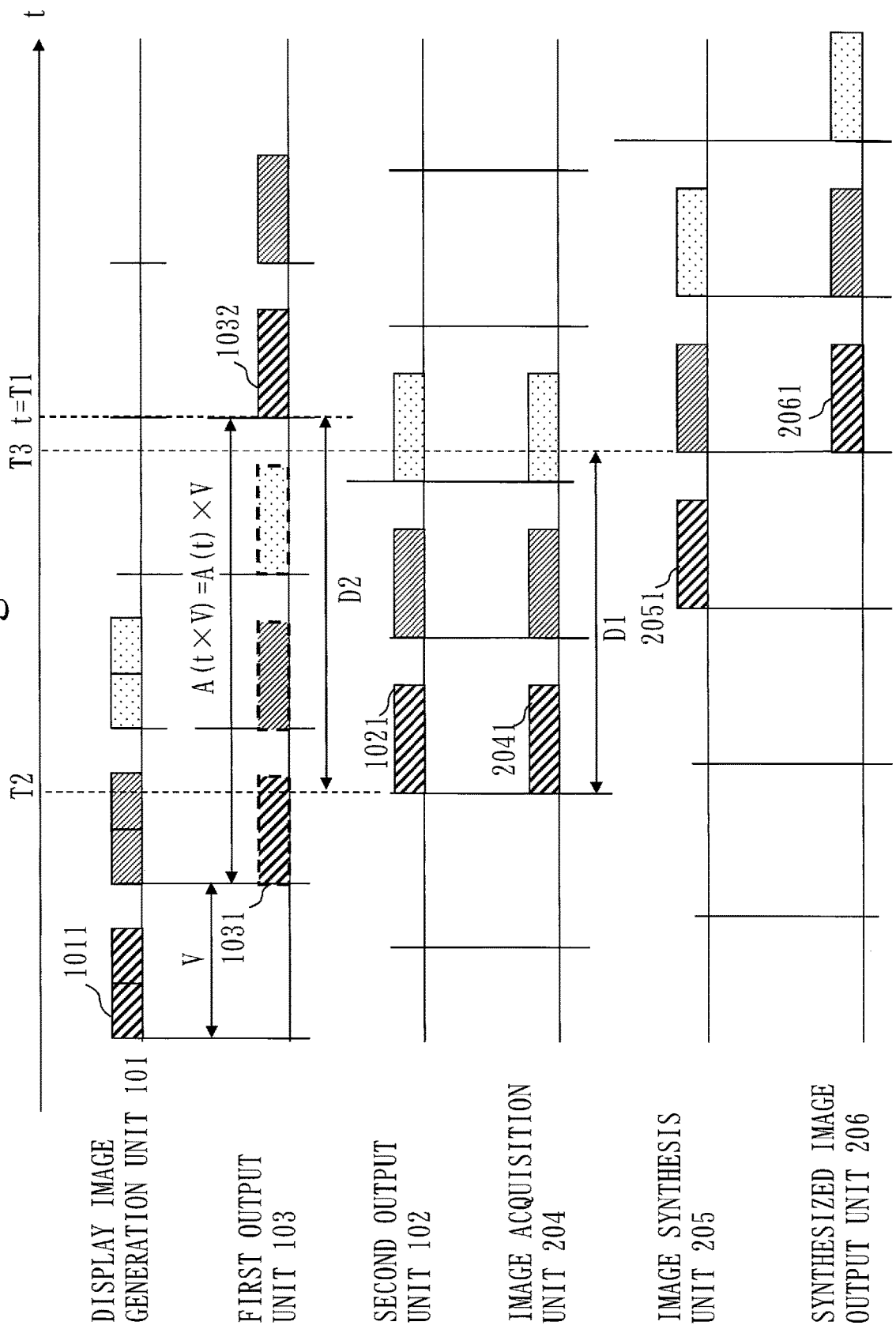
FIG. 7 is a diagram illustrating display image output timings according to Embodiment 1.
Figure 8:
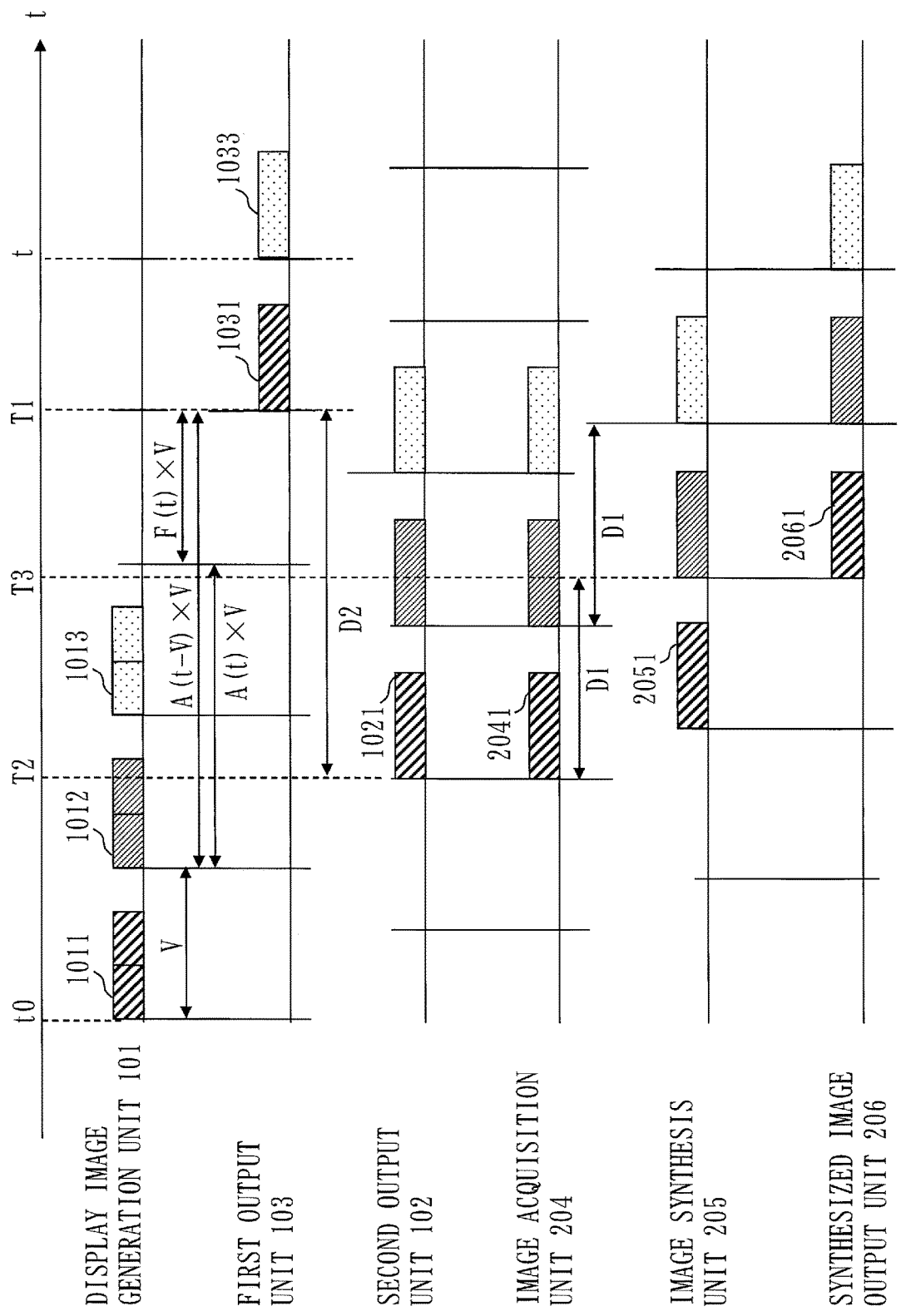
FIG. 8 is a diagram illustrating display image output timings according to Embodiment 1.

FIGS. 6, 7 and 8 each illustrate display image output timings of the display image generation unit 101, the first output unit 103, the second output unit 102, the image acquisition unit 204, the image synthesis unit 205, and the synthesized image output unit 206.

D1, D2, and V are the same as those illustrated in Expression (1). It is assumed herein that an output interval of the first output unit 103 and an output interval of the second output unit 102 are equal to the image generation interval V of the display image generation unit 101.

A(t) is the number of frames of the master display image 111 which are to be output by the first output unit 103 at time t and have waited in the buffer. A(t) can be obtained by the following expressions (4) and (5).

A(t−V) is the number of frames of the master display image 111 which are set to be output by the first output unit 103 at time (t−V) and have waited in the first output unit 103.

$$A(t)=A(t-V)+F(t) \text{ if } F(t)\leq 0 \quad \text{Expression(4)}$$

$$A(t)=A(t-V)+1 \text{ if } F(t)>0 \quad \text{Expression(5)}$$

If F(t)=3 and A(t−v)=5, for example, A(t)=8. On the other hand, if F(t)=−1 and A(t−v)=5, A(t)=4.

FIG. 6 illustrates states of the master display control terminal 100 and the slave display control terminal 200 immediately after activation. It is assumed that A(t) immediately after the activation is 0. In this case, until the delay time measurement unit 209 acquires D1 and notifies D1 to the frame progress computation unit 107, an oldest master display images 111 that have been buffered is output, with A(t) regarded as 0. If a time when the frame progress computation unit 107 could acquire D1 for the first time is t, the frame progress computation unit 107 obtains the number F(t) of frames that have progressed, using latest D1(t) and D2(t). In the case of FIG. 6, F(t)=3 is obtained. If F(t) is positive, output of the master display image 111 by the first output unit 103 is advanced too much from output of the synthesized image 250 image synthesis unit 205 by the synthesized image output unit 206. Thus, the first output unit 103 suspends the output for F(t). In the case of FIG. 6, the output of the first output unit 103 is advanced by 3 frames. Thus, the first output unit 103 keeps on displaying the master display image 111 displayed at the time of time t for 3 frames. While the same master display image 111 is being displayed, the number F(t) of frames that have progressed and the number of frames of the master display image 111 that have waited change. At time t+V, F(t+V)=2 is obtained from Expression (1), and A(t+V)=1 is obtained from Expression (5) because the master display image 111 to be output has waited for 1 frame. Similarly, at time t+2V, F(t+2V)=1 and A(t+2V)=2 are obtained. Then, at a time when F(t+3V)=0 and A(t+3V)=3 are obtained, the master display image 111 and the synthesized image 250 are simultaneously displayed.

FIG. 7 illustrates a case where at time t when the first output unit 103 and the synthesized image output unit 206 already display a same frame of the master original display image 110, F(t)=0 is continued. In this case, A(t)=3 and D2+D1, that is, T3−T1 is less than the V. Thus, F(t)=0 is obtained from Expression (1). A(t) does not need to be changed. Thus, the first output unit 103 selects an oldest one of the master display images 111 that are buffered.

FIG. 8 illustrates a case where at time t when the first output unit 103 and the synthesized image output unit 206 already display a same frame of the master original display image 110, as in FIG. 7, F(t)=−1. If F(t) is negative, the synthesized image output unit 206 is advanced by (−1×F(t)) frame(s). Thus, the first output unit 103 skips the (−1×F(t)) frame(s) sequentially, starting from an oldest one of the master display images 111 that are buffered, and selects the master display image 111 that is the oldest except for the skipped frame(s), thereby reducing a difference between the first output unit 103 and the synthesized image output unit 206.

A(t) obtained in FIG. 6 in the state where the master display image 111 and the slave display image 112 are simultaneously displayed may be acquired from an actual operation as in this embodiment or may be set by measurement in advance.

By disposing a mechanism for synchronizing output timings of the second output unit 102, the first output unit 103, and the synthesized image output unit 206 at each of the master display control terminal 100 and the slave display control terminal 200, display timings of a same frame of the display apparatus 10 and the display apparatus 20 can be completely aligned.

The respective processes illustrated in FIGS. 3 to 5 may be concurrently performed.

The above description has been given about an example where the image acquisition unit 204 notifies the acquisition timing of the slave display image 112 to the delay time measurement unit 209, the synthesized image output unit 206 notifies the output timing of the synthesized image 250 to the delay time measurement unit 209, and the delay time measurement unit 209 measures the synthesized image delay time. Instead of this, it is acceptable that the image acquisition unit 204 transfers the slave display image 112 to the delay time measurement unit 209 and the synthesized image output unit 206 transfers the synthesized image 250 to the delay time measurement unit 209, concurrently with output of the synthesized image 250 to the display apparatus 20. Then, it is also acceptable that the delay time measurement unit 209 measures the synthesized image delay time, based on the acquisition timing of the slave display image 112 and the acquisition timing of the synthesized image 250.

Description of Effects of Embodiment

As described above, according to this embodiment, the multi-screen synthesizing display system can be formed with a simple configuration and simple control.

That is, according to this embodiment, the timing of displaying the synthesized image 250 on the display apparatus 20 and the timing of displaying the master display image 111 on the display apparatus 10 can be matched with the simple configuration and the simple control.

Further, according to this embodiment, the synthesized image 250 can be generated in the slave display control terminal 200 by synthesizing the slave display image 112 generated by the master display control terminal 100 and the slave original display image 210 generated by the slave display control terminal 200. Then, the synthesized image 250 can be displayed on the display apparatus 20 and the master display image 111 can be displayed on the display apparatus 10.

Embodiment 2

In this embodiment, a function of changing image contents of each of the master display image 111, the slave display image 112, and the slave original display image 210 is added to the multi-screen synthesizing display system in the Embodiment 1.

Description of Configuration

Figure 9:
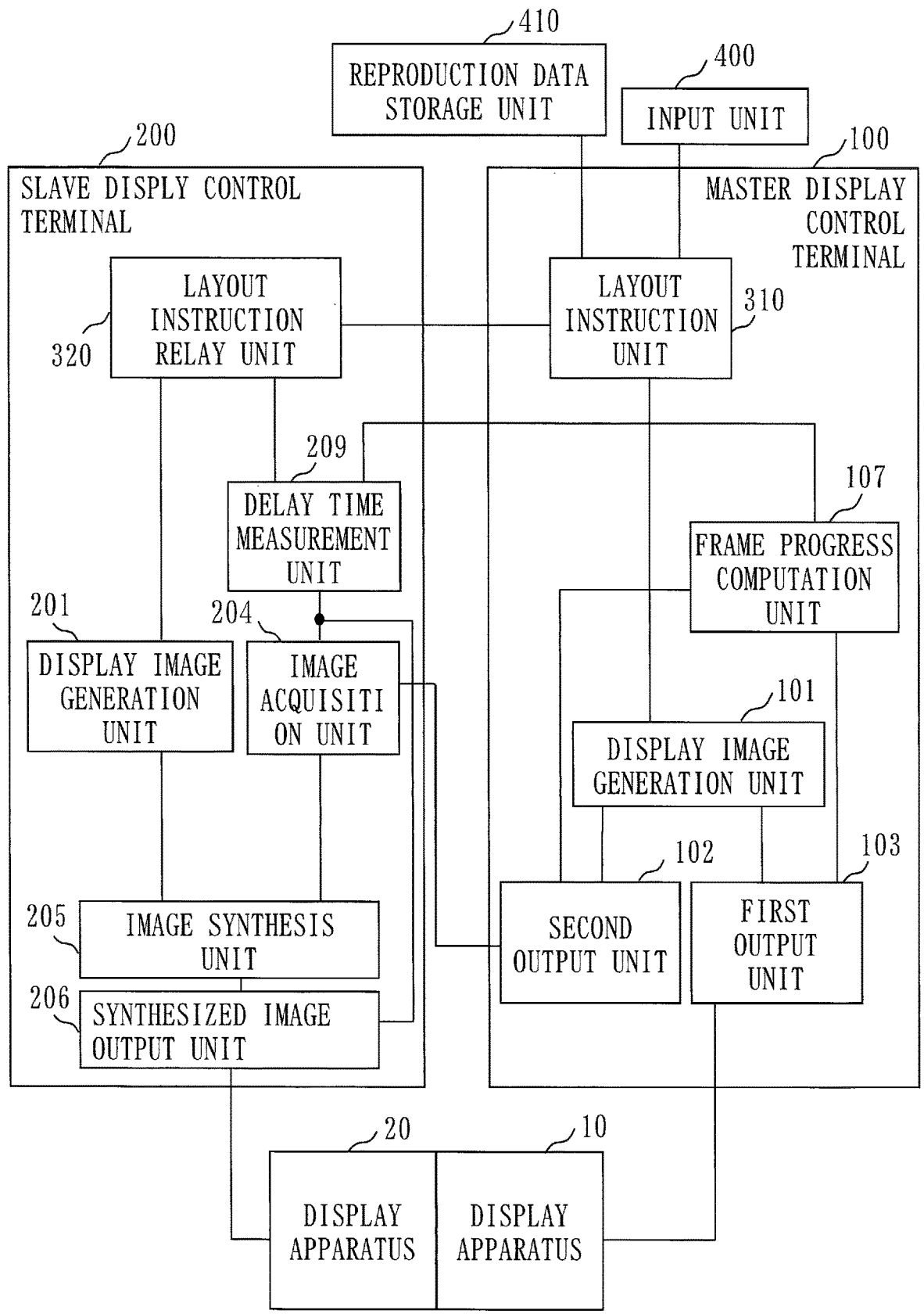
FIG. 9 is a configuration example of a multi-screen synthesizing display system according to Embodiment 2.

FIG. 9 illustrates a configuration example of a multi-screen synthesizing display system according to this embodiment.

Referring to FIG. 9, an input unit 400 is used for inputting by a user or a different apparatus, event information based on a schedule, into a master display control terminal 100. The input unit 400 is an input apparatus including a touch panel or the like, for example. The event information indicates an event such as clicking of a mouse or arrival of a display start time of subsequent contents in the schedule.

A reproduction data storage unit 410 stores moving picture data, image data, video data for reproducing an image of a program or the like, layout information indicating disposition and the drawing order of the image, the event information corresponding to the input from the input unit 400, and so on.

An internal configuration of each of the master display control terminal 100 and a slave display control terminal 200 is partially changed from that in FIG. 1. Details of the internal configuration of each of the master display control terminal 100 and the slave display control terminal 200 will be described later.

A hardware configuration example of the master display control terminal 100 is as illustrated in FIG. 15, and a hardware configuration example of the slave display control terminal 200 is as illustrated in FIG. 16.

A difference from Embodiment 1 will be mainly described below. Matters that are not described below are the same as those in Embodiment 1.

Before components of the master display control terminal 100 and the slave display control terminal 200 illustrated in FIG. 9 are described, an outline of operations of the master display control terminal 100 and the slave display control terminal 200 according to this embodiment will be described.

Figure 10:
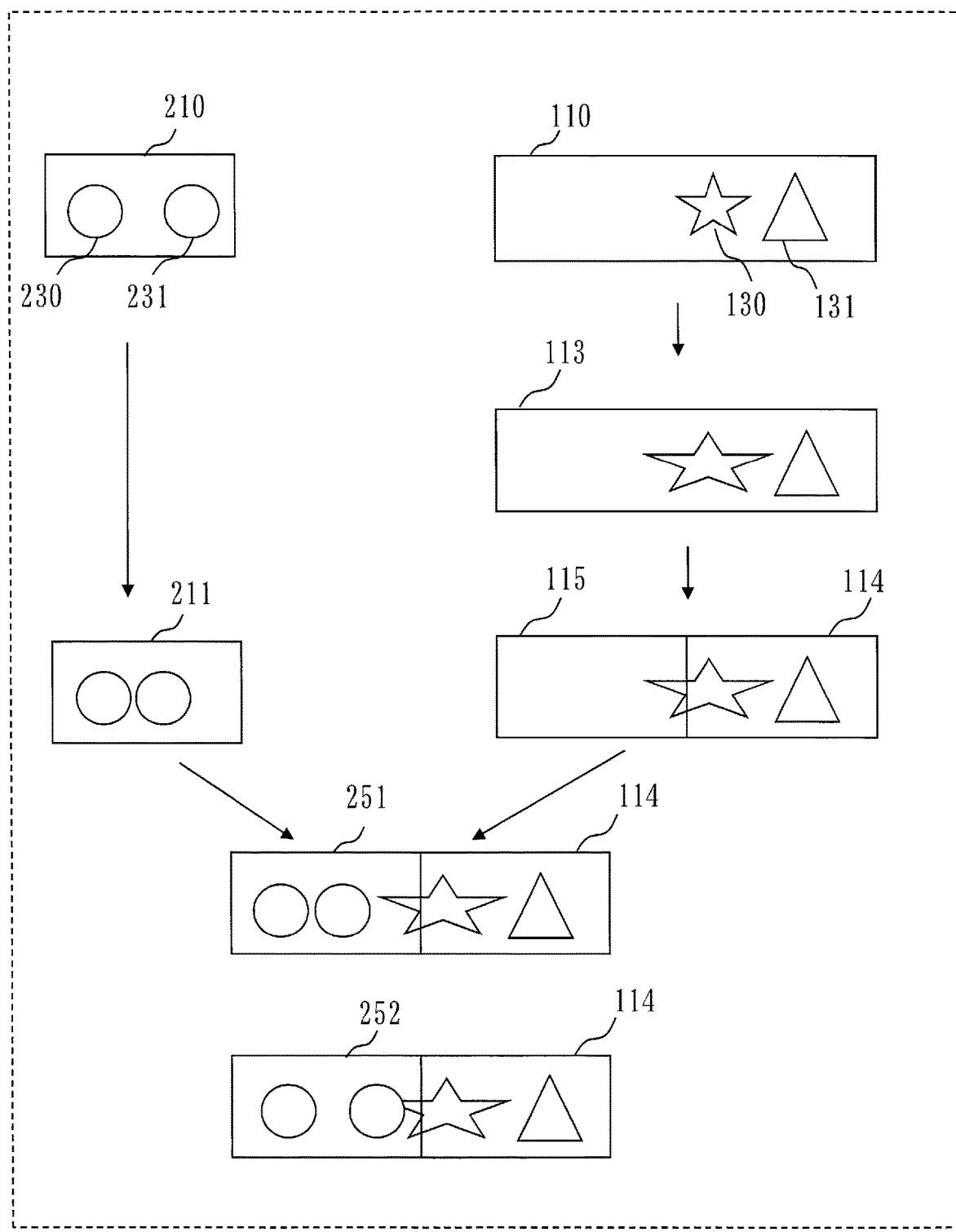
FIG. 10 is a diagram illustrating examples of display images according to Embodiment 2.

FIG. 10 illustrates examples of display images according to this embodiment.

Since a master original display image 110, a master display image 111, a slave display image 112, and a slave original display image 210 are the same as those illustrated in FIG. 2, description will be omitted.

In an altered master original display image 113, contents 130 of the master original display image 110 is magnified.

An altered master display image 114 is a display image that has been divided from the altered master original display image 113 and is to be displayed on a display apparatus 10.

An altered slave display image 115 is a display image that has been divided from the altered master original display image 113 and is to be output to the slave display control terminal 200.

If dispositions of contents 230 and 231 of the slave original display image 210 are not changed, a part of the magnified contents 130 is hidden by the contents 231 due to the magnification of the contents 130, as illustrated in the altered master display image 114 and an inappropriate synthesized image 252.

In order to avoid this situation, in this embodiment, the dispositions of the contents 230 and 231 of the slave original display image 210 are altered as in an altered slave original display image 211. Since the dispositions of the contents 230 and the contents 231 have been altered as in the altered slave original display image 211, the situation where the part of the magnified contents 130 is hidden by the contents 231 can be avoided, even if an altered synthesized image 251 that is obtained by synthesizing the altered slave display image 115 and the altered slave original display image 211 is displayed on a display apparatus 20 and the altered master display image 114 is displayed on the display apparatus 10.

In this embodiment, the altered master display image 114 corresponds to a first display image. The altered slave display image 115 corresponds to a second display image. The slave original display image 210 corresponds to a third display image, and the altered slave original display image 211 corresponds to a third display image after the image alteration process.

Subsequently, details of the components of the master display control terminal 100 and the slave display control terminal 200 will be described.

A layout instruction unit 310 instructs a display image generation unit 101 and a layout instruction relay unit 320 to alter, display, or delete a layout of contents according to the event information from the input unit 400 and based on event processing information obtained from the reproduction data storage unit 410. The event processing information is information that describes processing contents when an event occurs. To take an example, a process of reproducing a specified movie when a mouse click event occurs or the like is described in the event processing information.

The display image generation unit 101 performs an image alteration process for the master original display image 110, based on the instruction of the layout instruction unit 310. In other words, as illustrated in FIG. 10, the display image generation unit 101 alters a position and a size of the contents 130 of the master original display image 110, as in the altered master original display image 113.

A frame progress computation unit 107 includes a function of computing a slave display image generation time that is a delay time from generation of the master original display image 110 by the display image generation unit 101 to output of the altered slave display image 115 by a second output unit 102.

The layout instruction relay unit 320 instructs a display image generation unit 201 to alter a position of contents that is disposed on the slave original display image 210, based on the instruction from the layout instruction unit 310.

The display image generation unit 201 performs an image alteration process for the slave original display image 210, according to the instruction from the layout instruction relay unit 320. That is, as illustrated in FIG. 10, the display image generation unit 201 alters positions of the contents 230 and the contents 231 of the slave original display image 210, as in the altered slave original display image 211.

A delay time measurement unit 209 measures a synthesized image delay time, as in Embodiment 1. In this embodiment, however, the delay time measurement unit 209 measures, as the synthesized image delay time, a delay time from output of the altered slave display image 115 to the slave display control terminal 200 by the second output unit 102 to output of the altered synthesized image 251 from a synthesized image output unit 206 to the display apparatus 20, the altered synthesized image 251 being obtained by synthesis of the altered slave original display image 211 after the image alteration process by the display image generation unit 201 with the display image of the altered slave display image 115.

Further, the delay time measurement unit 209 measures a slave original display image generation time that is a delay time from generation of the altered slave original display image 211 after the image alteration process by the display image generation unit 201 to the output of the altered synthesized image 251 obtained by the synthesis of the altered slave original display image 211 with the display image of the altered slave display image 115 from the synthesized image output unit 206 to the display apparatus 20. Further, the delay time measurement unit 209 computes a layout execution delay time being a delay time of generation of the master original display image 110 by the display image generation unit 101 and a delay time of generation of the slave original display image 210 by the display image generation unit 201, using the slave display image generation time that is acquired from the frame progress computation unit 107 and the output time of the slave original display image.

After the layout instruction relay unit 320 has received the instruction from the layout instruction unit 310, the layout instruction relay unit 320 instructs the display image generation unit 201 to alter the layout, with a delay corresponding to the layout execution delay time.

An image synthesis unit 205 acquires the altered slave original display image 211 from the display image generation unit 201 and buffers the altered slave original display image 211. The image synthesis unit 205 acquires the altered slave display image 115 from an image acquisition unit 204 and buffers the acquired altered slave display image 115. Then, the image synthesis unit 205 synthesizes the altered slave original display image 211 and the altered slave display image 115, thereby generating the altered synthesized image 251.

Since the components other than those mentioned above are the same as those in Embodiment 1, description will be omitted.

Description of Operations

Figure 11:
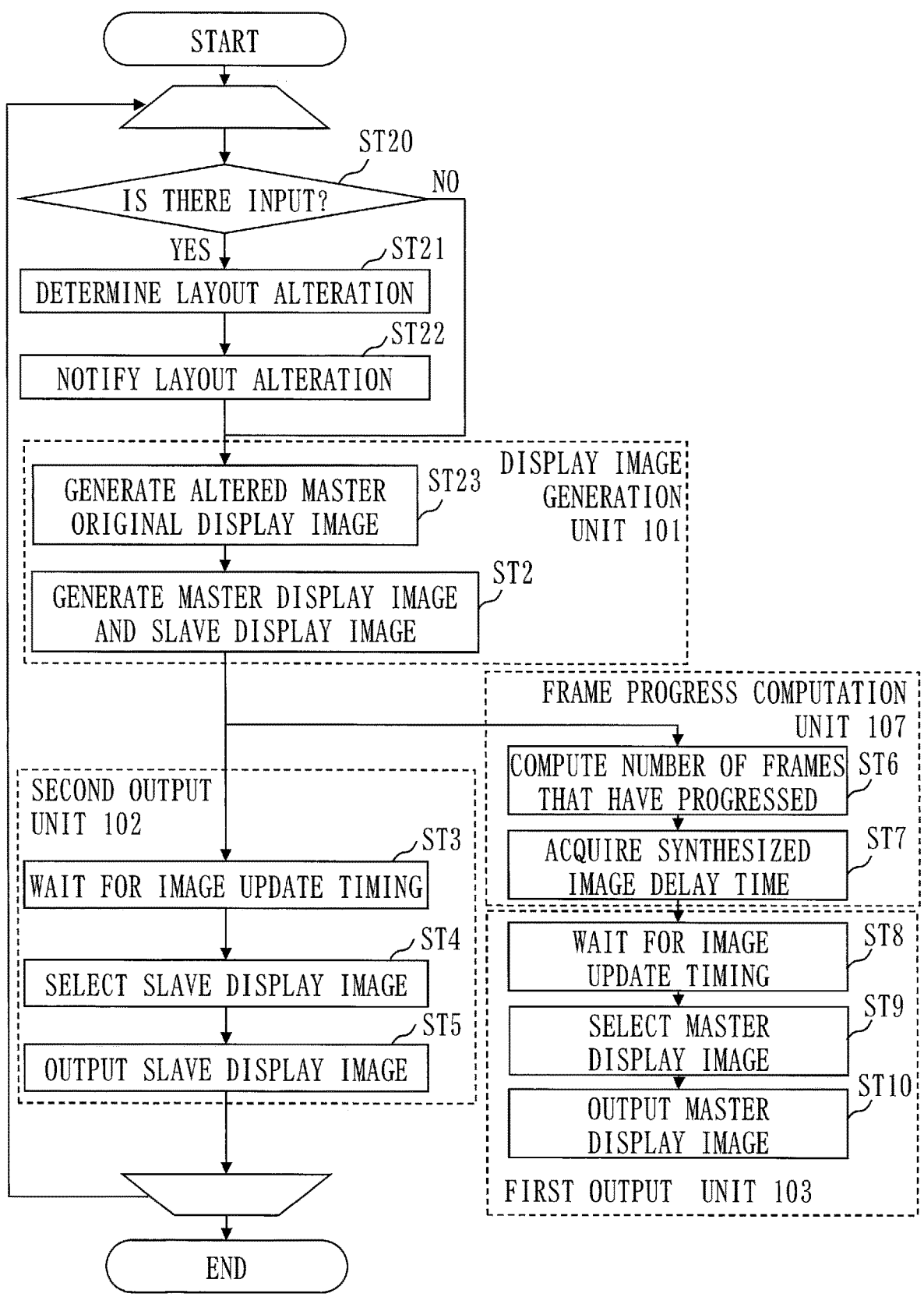
FIG. 11 is a flowchart diagram illustrating an operation example of a master display control terminal according to Embodiment 2.

FIG. 11 illustrates an operation example of the master display control terminal 100 according to this embodiment.

In step ST20, the layout instruction unit 310 detects an input of event information.

In step ST21, the layout instruction unit 310 determines a layout alteration in each of the master original display image 110 and the slave original display image 210, based on the input event information.

In step ST22, the layout instruction unit 310 notifies layout information notifying the determined layout alteration of the master original display image 110 to the display image generation unit 101 and outputs layout information notifying the determined layout alteration of the slave original display image 210 to the layout instruction relay unit 320.

In step ST23, based on the layout information from the layout instruction unit 310, the display image generation unit 101 magnifies the contents 130 of the master original display image 110, as illustrated in FIG. 10, thereby generating the altered master original display image 113.

Since processes after ST2 are the same as those in Embodiment 1, description of the processes after ST2 will be omitted.

Figure 12:
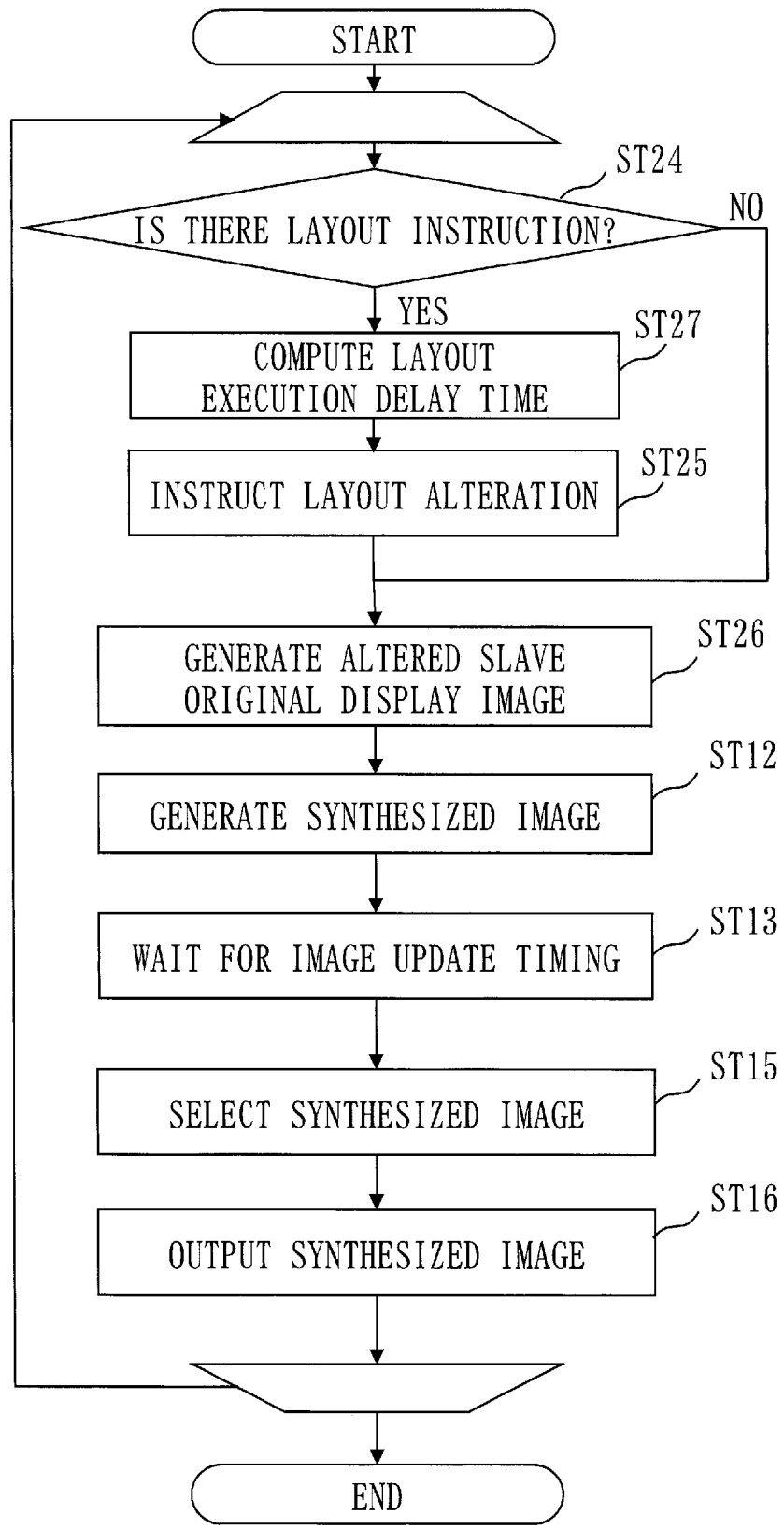
FIG. 12 is a flowchart diagram illustrating an operation example of a slave display control terminal according to Embodiment 2.

FIG. 12 illustrates an operation example of the slave display control terminal 200 according to this embodiment.

In step ST24, the layout instruction relay unit 320 acquires the layout information from the layout instruction unit 310.

In step ST27, the delay time measurement unit 209 acquires the slave display image generation time and the output time of the slave original display image 210 from the frame progress computation unit 107, acquires the output time of a synthesized image 250 from the synthesized image output unit 206, and computes the layout execution delay time, using the slave display image generation time, the output time of the slave original display image 210, and the output time of the synthesized image 250.

In step ST25, the layout instruction relay unit 320 instructs the display image generation unit 201 to alter the layout of the slave original display image 210 with a delay corresponding to the layout execution delay time.

In step ST26, the display image generation unit 201 alters the positions of the contents 230 and the contents 231 of the slave original display image 210, as illustrated in FIG. 10, based on the instruction from the layout instruction relay unit 320, thereby generating the altered slave original display image 211.

Further, the display image generation unit 201 notifies, to the delay time measurement unit 209, the time when the slave original display image 210 has been output.

Since processes after ST12 are the same as those in Embodiment 1, description will be omitted.

Description of Effect of Embodiment

As described above, according to this embodiment, the multi-screen synthesizing display system can be formed in which the layout of the contents on the display image to be displayed on the display apparatus 20 is altered according to the layout of the contents of the display image that is displayed on the display apparatus 10.

In this embodiment, it is acceptable that the layout execution delay time is not used in ST25 and the image synthesis unit 205 acquires the layout execution delay time in step S12 and adjusts a buffering amount of the slave original display image 210. However, in that case, a display delay time of the slave original display image 210 becomes longer.

Embodiment 3

In this embodiment, a description will be directed to a multi-screen synthesizing display system in which no distinction is made between a master display control terminal and a slave display control terminal.

Figure 13:
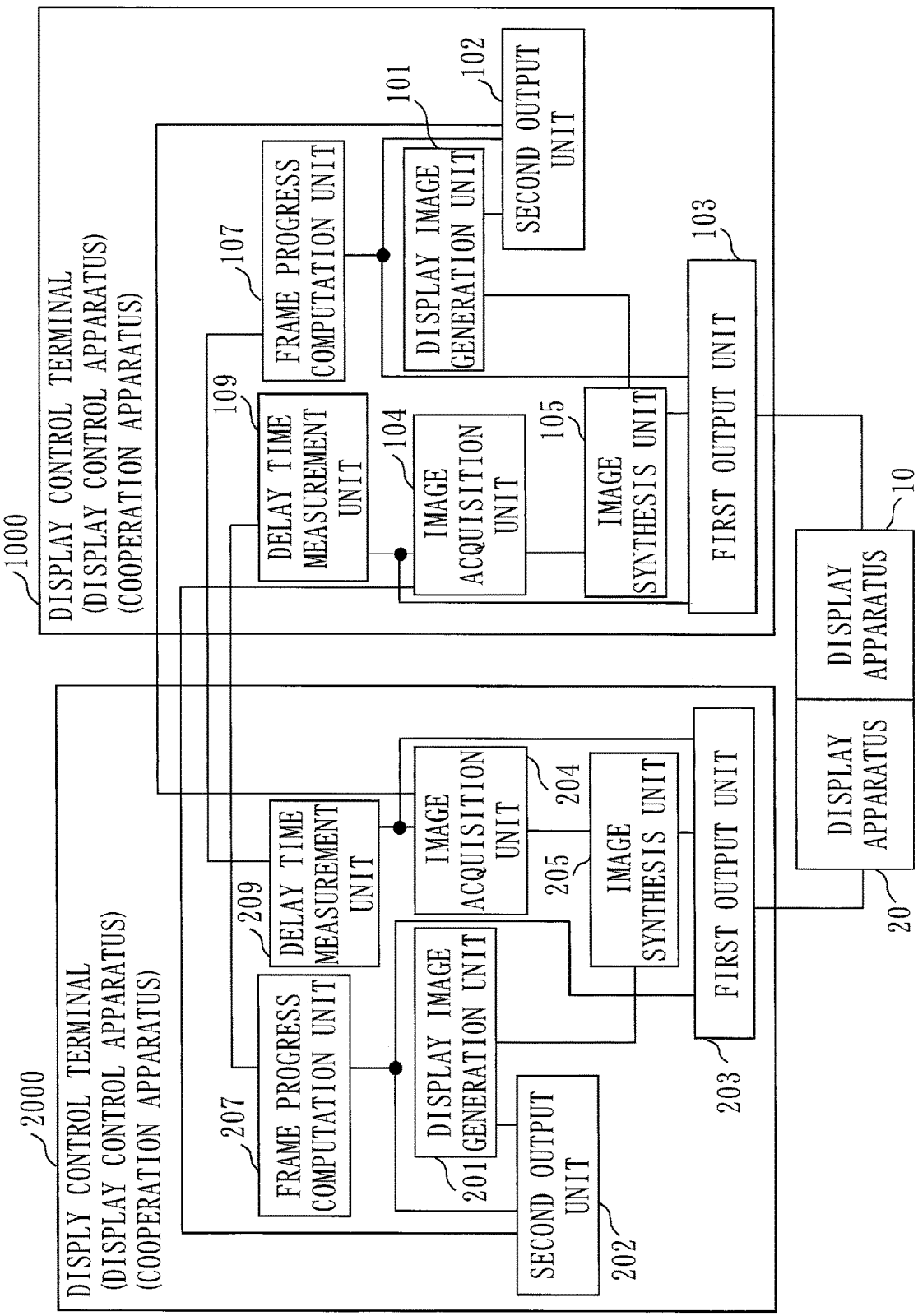
FIG. 13 is a diagram illustrating a configuration example of a multi-screen synthesizing display system according to Embodiment 3.

FIG. 13 illustrates a configuration example of the multi-screen synthesizing display system according to this embodiment.

A display control terminal 1000 and a display control terminal 2000 have a same internal configuration.

Each of the display control terminal 1000 and the display control terminal 2000 includes functional configurations of the master display control terminal 100 and the slave display control terminal 200 that are illustrated in FIG. 1. The display control terminal 1000 is connected to a display apparatus 10.

The display control terminal 2000 is connected to a display apparatus 20. Further, the display control terminal 1000 and the display control terminal 2000 are also connected.

The display control terminal 1000, as in Embodiment 1, can output the master display image 111 illustrated in FIG. 2 to the display apparatus 10 and can cause the synthesized image 250 illustrated in FIG. 2 to be output from the display control terminal 2000 to the display apparatus 20.

The display control terminal 2000 as well can output the master display image 111 illustrated in FIG. 2 to the display apparatus 20 and can cause the synthesized image 250 illustrated in FIG. 2 to be output from the display control terminal 1000 to the display apparatus 10.

Each of the display control terminal 1000 and the display control terminal 2000 corresponds to a display control apparatus. The display control terminal 2000 corresponds to a cooperation apparatus for the display control terminal 1000, and the display control terminal 1000 corresponds to a cooperation apparatus for the display control terminal 2000.

The display apparatus 10 corresponds to a first display apparatus and the display apparatus 20 corresponds to a second display apparatus, for the display control terminal 1000. The display apparatus 20 corresponds to a first display apparatus and the display apparatus 10 corresponds to a second display apparatus, for the display control terminal 2000.

In the display control terminal 1000, a display image generation unit 101, a second output unit 102, a first output unit 103, and a frame progress computation unit 107 are the same as those illustrated in FIG. 1.

Further, an image acquisition unit 104, an image synthesis unit 105, and a delay time measurement unit 109 perform same operations as those of the image acquisition unit 204, the image synthesis unit 205, and the delay time measurement unit 209 illustrated in FIG. 1. The image acquisition unit 204 acquires a display image (cooperating display image) generated in the display control terminal 2000 that is the cooperation apparatus from the display control terminal 2000. The image synthesis unit 105 synthesizes the cooperating display image and a display image generated by the display image generation unit 101. The delay time measurement unit 109 measures a time from the acquisition of the cooperating display image by an image acquisition unit 204 to output of a synthesized image to the display apparatus 10 by the first output unit 103.

In the display control terminal 2000, a second output unit 202, a first output unit 203, and a frame progress computation unit 207 perform same operations as those of the second output unit 102, the first output unit 103, and the frame progress computation unit 107 illustrated in FIG. 1.

A display image generation unit 201, an image acquisition unit 204, an image synthesis unit 205, and a synthesized image output unit 206 are the same as those illustrated in FIG. 1.

Each of the display control terminal 1000 and the display control terminal 2000 is configured with a processor, a storage device, and an input/output interface, as in FIGS. 15 and 16.

Figure 14:
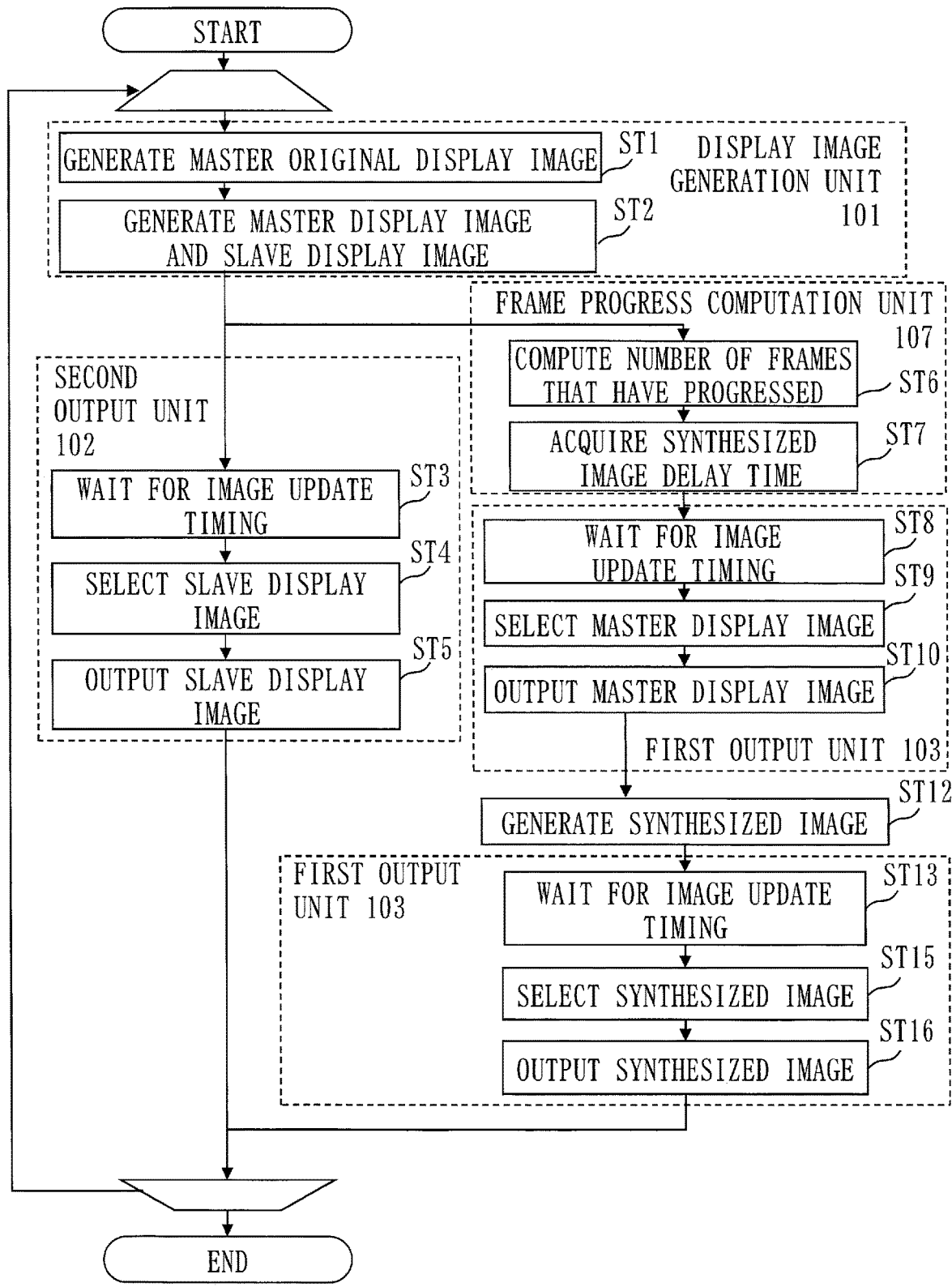
FIG. 14 is a flowchart diagram illustrating an operation example of a display control terminal according to Embodiment 3.

FIG. 14 illustrates an operation example of the display control terminal 1000.

Since each process step in FIG. 14 is the same as the process step with a same number illustrated in Embodiment 1, description will be omitted.

The display control terminal 2000 as well performs operations in FIG. 14.

Each of the display control terminal 1000 and the display control terminal 2000 performs operations in FIG. 5 illustrated in Embodiment 1, in addition to the operations in FIG. 14.

As described above, according to this embodiment, the multi-screen synthesizing display system can be formed in which the display images generated by both of the display control terminals are synthesized and displayed on the display apparatus 10 and the display apparatus 20, with no distinction made between the master display control terminal and the slave display control terminal.

Description of Hardware Configuration

Finally, supplementary description of the hardware configuration of each of the master display control terminal 100 and the slave display control terminal 200 will be given.

Though the hardware configuration of the master display control terminal 100 will be described below, the following description is applied to the hardware configuration of the slave display control terminal 200 as well.

The processor 911 illustrated in FIG. 15 is an IC (Integrated Circuit) to perform processing.

The processor 911 is a CPU (Central Processing Unit), a DSP (Digital Signal Processor), or the like.

The storage device 912 illustrated in FIG. 15 is a RAM (Random Access Memory), a ROM (Read Only Memory), a flash memory, an HDD (Hard Disk Drive), or the like.

An OS (Operating System) is stored in the storage device 912.

Then, at least part of the OS is executed by the processor 911.

The processor 911 executes the programs to implement the functions of the display image generation unit 101, the second output unit 102, the first output unit 103, and the frame progress computation unit 107 (hereinafter collectively referred to as "units") while executing the at least part of the OS.

Though one processor is illustrated in FIG. 15, the master display control terminal 100 may include a plurality of the processors.

Information, data, signal values, and variable values representing results of processing performed by the "units" are stored in the storage device 912, or a register or a cache memory in the processor 911.

The programs to implement the functions of the "units" may be stored in a portable storage medium such as a magnetic disk, a flexible disk, an optical disk, a compact disk, a blue ray (registered trade mark) disk, or a DVD.

Each "unit" may be read as a "circuit", a "step", a "procedure", or a "process".

The master display control terminal 100 may be implemented by an electronic circuit such as a logic IC (Integrated Circuit), a GA (Gate Array), an ASIC (Application Specific Integrated Circuit), or an FPGA (Field-Programmable Gate Array).

In this case, each "unit" is implemented as a part of the electronic circuit.

The processor and the above-mentioned electronic circuit are also collectively referred to as processing circuitry.

While the above description has been given about the embodiments of the present invention, two or more of these embodiments may be carried out in combination.

Alternatively, one of these embodiments may be partially carried out.

Alternatively, two or more of these embodiments may be partially combined to be carried out.

The present invention is not limited to these embodiments, and various modifications are possible as necessary

REFERENCE SIGNS LIST

10: display apparatus; 20: display apparatus; 100: master display control terminal; 101: display image generation unit; 102: second output unit; 103: first output unit; 104: image acquisition unit; 105: image synthesis unit; 107: frame progress computation unit; 109: delay time measurement unit; 110: master original display image; 111: master display image; 112: slave display image; 113: altered master original display image; 114: altered master display image; 115: altered slave display image; 130: contents; 131: contents; 200: slave display control terminal; 201: display image generation unit; 202: second output unit; 203: first output unit; 204: image acquisition unit; 205: image synthesis unit; 206: synthesized image output unit; 207: frame progress computation unit; 209: delay time measurement unit; 210: slave original display image; 211: altered slave original display image; 230: contents; 231: contents; 250: synthesized image; 251: altered synthesized image; 252: inappropriate synthesized image; 310: layout instruction unit; 320: layout instruction relay unit; 400: input unit; 410: reproduction data storage unit; 911: processor; 912: storage device; 913: input/output interface; 921: processor; 922: storage device; 923: input/output interface; 1000: display control terminal; 2000: display control terminal

The invention claimed is:

1. A display control apparatus connected to a first display apparatus and a cooperation apparatus connected to a second display apparatus, the display control apparatus comprising:
   processing circuitry to:
   generate a first display image to be output to the first display apparatus and a second display image to be output to the cooperation apparatus;
   output the first display image to the first display apparatus;
   output the second display image to the cooperation apparatus; and
   control a timing of output of the first display image, based on a synthesized image delay time being a delay time from the output of the second display image to the cooperation apparatus to output of a synthesized image from the cooperation apparatus to the second display apparatus, the synthesized image being obtained by synthesizing a third display image with the second display image in the cooperation apparatus.

2. The display control apparatus according to claim 1, wherein the processing circuitry controls the timing of the output of the first display image so that the output of the synthesized image to the second display apparatus by the cooperation apparatus and the output of the first display image to the first display apparatus are concurrently performed.

3. The display control apparatus according to claim 1, wherein the processing circuitry repeatedly generates the first display image and the second display image with an image generation interval which is constant, and
   wherein the processing circuitry controls the timing of the output of the first display image, based on a division value that is obtained by dividing the synthesized image delay time by the image generation interval.

4. The display control apparatus according to claim 1, wherein the processing circuitry repeatedly generates the first display image and the second display image with an image generation interval which is constant,
   wherein the processing circuitry repeatedly outputs the first display image to the first display apparatus with an output interval which is constant,
   wherein the processing circuitry repeatedly outputs the second display image to the cooperation apparatus with an output interval which is constant, and
   wherein when there is a deviation between a cycle of the output of the first display image and a cycle of the output of the second display image, the processing circuitry controls the timing of the output of the first display image, based on a division value that is obtained by dividing a total time of the deviation and the synthesized image delay time by the image generation interval.

5. The display control apparatus according to claim 1, wherein when an image alteration process to alter image contents of the third display image is performed in the cooperation apparatus, the processing circuitry controls the timing of the output of the first display image, based on a synthesized image delay time being a delay time from the output of the second display image to the cooperation apparatus to output of a synthesized image from the cooperation apparatus to the second display apparatus, the synthesized image being obtained by synthesizing a third display image after the image alteration process with the second display image in the cooperation apparatus.

6. The display control apparatus according to claim 1,
wherein the processing circuitry acquires, from the cooperation apparatus, a cooperating display image being a display image generated in the cooperation apparatus,
wherein the processing circuitry synthesizes the cooperating display image and a display image different from the cooperating display image, and
wherein the processing circuitry outputs, to the first display apparatus, an image obtained by the synthesis.

7. A display control method by a computer connected to a first display apparatus and a cooperation apparatus connected to a second display apparatus, the display control method comprising:
  generating a first display image to be output to the first display apparatus and a second display image to be output to the cooperation apparatus;
  outputting the second display image to the cooperation apparatus; and
  controlling a timing of output of the first display image to the first display apparatus, based on a synthesized image delay time being a delay time from the output of the second display image to the cooperation apparatus to output of a synthesized image from the cooperation apparatus to the second display apparatus, the synthesized image being obtained by synthesizing a third display image with the second display image in the cooperation apparatus.

8. A non-transitory computer readable medium storing a display control program to cause, a computer connected to a first display apparatus and a cooperation apparatus connected to a second display apparatus, to execute:
  a display image generation process of generating a first display image to be output to the first display apparatus and a second display image to be output to the cooperation apparatus;
  a first output process of outputting the first display image to the first display apparatus;
  a second output process of outputting the second display image to the cooperation apparatus; and
  an output timing control process of controlling a timing of output of the first display image by the first output process, based on a synthesized image delay time being a delay time from the output of the second display image to the cooperation apparatus by the second output process to output of a synthesized image from the cooperation apparatus to the second display apparatus, the synthesized image being obtained by synthesizing a third display image with the second display image in the cooperation apparatus.

* * * * *